Patented Apr. 19, 1932

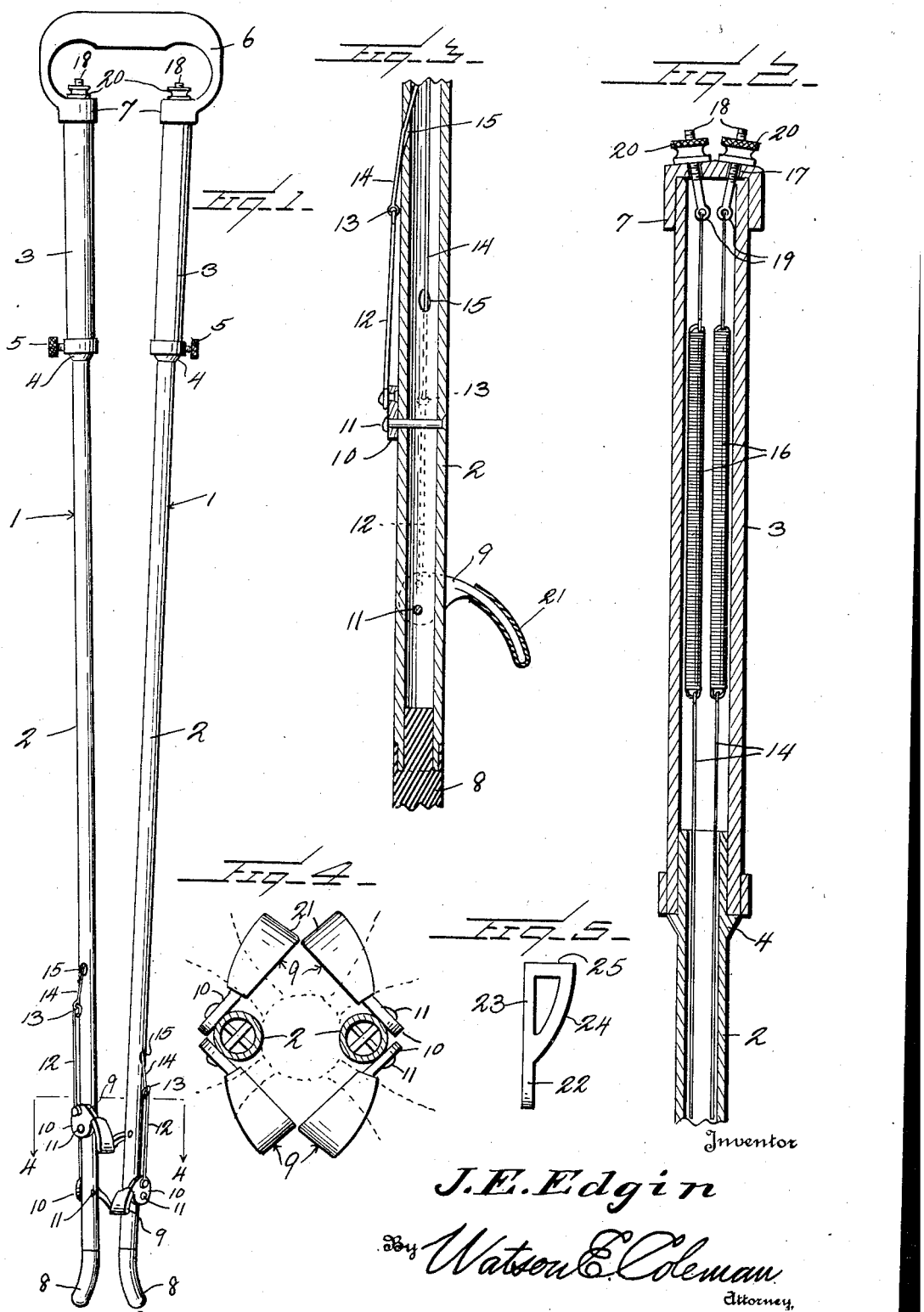

1,855,104

UNITED STATES PATENT OFFICE

JAMES E. EDGIN, OF CHARLOTTE, TENNESSEE, ASSIGNOR OF ONE-HALF TO THOMAS H. RICHARDSON, OF DICKSON, TENNESSEE

IMPLEMENT FOR REMOVING SUCKER BUDS FROM TOBACCO PLANTS

Application filed May 21, 1931. Serial No. 539,104.

This invention relates to improvements in hand implements for use in connection with the raising of tobacco, and pertains particularly to an implement for the expeditious removal of sucker buds from tobacco.

In the raising of tobacco after the plants have been topped new growths develop in the axils between the remaining leaves and the plant stalk, which are known as suckers or sucker buds, and these must be removed in order to insure the proper development of the remaining leaves. Up until the present time it has been customary to remove these suckers by hand, it being necessary that the workmen break or cut off each sucker with a suitable instrument.

The primary object of the present invention is to provide a device by means of which the removal of suckers from a plant may be accomplished easily and quickly and whereby a single workman may accomplish in one day several times the amount of work which it is possible to accomplish by the slow method of removing the suckers individually by hand.

A further object of the invention is to provide a hand controlled implement which will remove sucker buds from a plant without damaging the leaves thereof.

Still another object of the invention is to provide an implement having a pair of elongated members which are connected and adapted to be moved longitudinally of a plant stalk and which carry pivotally mounted spring held fingers which pass over the axils in which the suckers occur and break off the same, and then yield upon contact with the adjacent leaves so as to pass by the same without doing any damage thereto.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in side elevation of the implement embodying the present invention.

Figure 2 is a longitudinal sectional view through the upper portion of one of the elongated members of the implement.

Figure 3 is a longitudinal sectional view through the lower end of one of the elongated members of the implement.

Figure 4 is a view in transverse section taken on the line 4—4 of Figure 1 showing the parts on an enlarged scale.

Figure 5 is a detailed view of a modified form of sucker engaging finger.

Referring now more particularly to the drawings, wherein like numerals of reference indicate corresponding parts throughout the several views, the numerals 1 each indicate generally one of the elongated members which carry the sucker engaging fingers of the device. Each of these elongated members consists of a rod 2 which is tubular and of a flexible character, and a cylinder 3 into which the upper end of the rod extends. A shoulder 4 surrounding each rod 2 adjacent its upper end limits the movement of the rod into the cylinder and each rod is rotatably secured in its cylinder by a set screw 5. The same set screw 5 secures rod 2 against axial movement in its cylinder 3.

The upper ends of the elongated members are connected by a substantially C-shaped handle 6. Each end of this handle is formed to provide a socket 7 into which a cylinder 3 extends and is secured in any suitable manner as by welding or the like.

The lower end of each rod 2 carries a slightly curved rubber tip 8 and adjacent this rubber tipped end, each rod has pivotally secured thereto a relatively long curved and flat sucker engaging finger 9. Each of these fingers 9 has a flat disk-like inner end 10 which is pivotally secured below its center, by a pin 11, to its supporting rod. Above its center each disk 10 has connected thereto one end of a wire link 12, the other end of which has loose connection, as at 13, with a wire 14 which passes through an adjacent aperture 15 in the tubular rod to the interior thereof. Each of the wires 14 extends through the adjacent rod into the adjoining cylinder 3 where it is connected to one end of one of a pair of coil springs 16 housed in the cylinder.

The socket 7 upon each cylinder 3 has a pair of apertures 17 therethrough through which extend, from the interior of the adjacent cylinder, the threaded screws 18, the inner ends of which are formed to provide the eyes 19 which are connected with the adjacent springs 16. The threaded outer end of each screw 18 carries a nut 20 which bears upon the top of the socket 7 in the manner shown in Figure 2. It will thus be seen that by rotating the thumb nuts 20 in the proper manner the screws 18 may be drawn outwardly and the tension of the springs 16 thus increased.

The fingers 9 upon each of the rods 2 are disposed in substantially right angular relation and are arranged at different elevations and their arrangement is such also that the low one upon one rod will be directed oppositely to the low one upon the adjacent rod and will be in the same horizontal plane with the same. This applies also to the upper ones of the fingers upon the two rods. With this arrangement of the fingers, when the rods 2 are disposed longitudinally and upon opposite sides of a plant stalk the fingers will present in plan a hollow square arrangement in the center of which the stalk is located.

In the use of the present device the operator holds the same by the handle 6 and lowers it vertically so that the rods 2 will pass down along the sides of the plant stalk in the position in which they are shown in Figure 4, the stalk here being indicated in dotted lines. As the tobacco leaves are spaced about the stalk of the plant at intervals of approximately ninety degrees it will thus be seen that each of the fingers will come into contact with a leaf as the rods are moved downwardly.

Each finger will, therefore, engage the sucker bud which develops in the axil of the leaf and will break the same off. However, the resistance of the leaf will be sufficient to overcome the pull of the spring holding the finger which comes into contact therewith and the finger will therefore be swung upwardly and will pass over the leaf without damaging it.

In order to further obviate the possibility of any damage to the plant stalk or to the leaves, each of the fingers is covered by a rubber sheath 21.

In Figure 5 there is illustrated a modified form of the finger shown in the other views. The finger 9 is shown as being of substantially spatulate formation and longitudinally curved. In the modified form shown in Figure 5 the same configuration is employed but this finger, which is indicated by the numeral 22, is forked, having the two portions 23 and 24 and the outer ends of these portions are connected by a cross piece 25. With a finger of this design the possibility of any of the sucker buds escaping being removed is eliminated for the buds will be caught between the fork portions 23 and 24 and thus torn away from the stalk.

From the foregoing description it will be readily seen that with an implement of the character herein described it is only necessary to run the rods down once lengthwise of the plant stalk in order to effectively remove all of the sucker buds from the plant.

By securing the rods 2 in the cylinders 3 by means of the set screws 5 the rod may be oscillated, if necessary, to adjust the fingers to the best working position.

Having thus described the invention, what is claimed is:

1. A tobacco plant sucker bud remover, comprising a pair of elongated connected members, and sucker bud engaging fingers yieldably supported on said members, said fingers being arranged to form a hollow square about a plant stalk when the same is disposed between the members.

2. A tobacco plant sucker bud remover, comprising a pair of elongated members connected to facilitate their being moved vertically of a plant stalk and upon opposite sides of the plant, and relatively broad curved fingers yieldably mounted on said members and designed to break off the sucker buds when moved along the plant stalk.

3. A tobacco plant sucker bud remover, comprising a pair of rods connected together at one end, a pair of finger members pivotally mounted on each rod adjacent the other end thereof, said fingers being substantially right angularly related, and resilient means constantly urging the fingers to a set position.

4. A tobacco plant sucker bud remover, comprising a pair of rods connected together at one end, a pair of finger members pivotally mounted on each rod adjacent the other end thereof, said fingers being substantially right angularly related, resilient means constantly urging the fingers to a set position, and means for axially rotating said rods for the adjustment of the fingers of one rod with relation to those upon the other rod.

5. A tobacco plant sucker bud remover, comprising a pair of relatively long rod members, a connection between said rods at one end constituting a handle, finger members oscillatably mounted on and projecting outwardly from the rods adjacent their other ends, and resilient means connected with said fingers for restoring them to normal position after they have been oscillated upwardly.

6. A tobacco plant sucker bud remover, comprising a pair of relatively long rod members, a connection between said rods at one end constituting a handle, finger members oscillatably mounted on and projecting outwardly from the rods adjacent their other ends, said members being longitudinally curved and having their free ends directed downwardly, and resilient means normally resisting the oscillation of the fingers.

7. A tobacco plant sucker bud remover, comprising a rod, a pair of finger members each pivotally attached at one end to said rod adjacent one end of the same and projecting outwardly therefrom, spring elements housed in one end of the rod, and connecting means between each of said springs and a finger, whereby the finger normally resists oscillatory movement in one direction.

8. A tobacco plant sucker bud remover, comprising a rod, a pair of finger members each pivotally attached at one end to said rod adjacent one end of the same and projecting outwardly therefrom, spring elements housed in one end of the rod, connecting means between each of said springs and a finger, whereby the finger normally resists oscillatory movement in one direction, and means for regulating the tension of said springs and the resistance of the fingers to movement.

9. A tobacco plant sucker bud remover, comprising a pair of rod members, a pair of cylinders each receiving in one end, one end of a rod member, means for securing each rod against axial movement in its cylinder, a handle member connecting the other ends of said cylinders, a pair of finger members each pivotally mounted at one end upon each rod at the end thereof remote from the cylinders, each pair of fingers being substantially right angularly disposed upon its rod and the fingers upon the two rods outlining in plan a square, a pair of spring members housed in each cylinder, and control wires extending longitudinally through each rod and each having connection at one end with a spring and at its other end with a finger whereby the finger is normally maintained in a set position but is permitted vertical oscillation.

10. A tobacco plant sucker bud remover, comprising a pair of rod members, a pair of cylinders each receiving in one end, one end of a rod member, means for securing each rod against axial movement in its cylinder, a handle member connecting the other ends of said cylinders, a pair of finger members each pivotally mounted at one end upon each rod at the end thereof remote from the cylinders, each pair of fingers being substantially right angularly disposed upon its rod and the fingers upon the two rods outlining in plan a square, a pair of spring members housed in each cylinder, control wires extending longitudinally through each rod and each having connection at one end with a spring and at its other end with a finger whereby the finger is normally maintained in a set position but is permitted vertical oscillation, and means for tensioning said springs.

11. A tobacco plant sucker bud remover, comprising a pair of rod members, a pair of cylinders each receiving in one end, one end of a rod member, means for securing each rod against axial movement in its cylinder, a handle member connecting the other ends of said cylinders, a pair of finger members each pivotally mounted at one end upon each rod at the end thereof remote from the cylinders, each pair of fingers being substantially right angularly disposed upon its rod and the fingers upon the two rods outlining in plan a square, a pair of spring members housed in each cylinder, control wires extending longitudinally through each rod and each having connection at one end with a spring and at its other end with a finger whereby the finger is normally maintained in a set position but is permitted vertical oscillation, and resilient guard tips upon the ends of the rods adjacent the fingers.

In testimony whereof I hereunto affix my signature.

JAMES E. EDGIN.